R. L. BRYAN.
IMPLEMENT FOR TIGHTENING WIRE FENCES.
APPLICATION FILED SEPT. 16, 1914.
1,268,922.
Patented June 11, 1918.
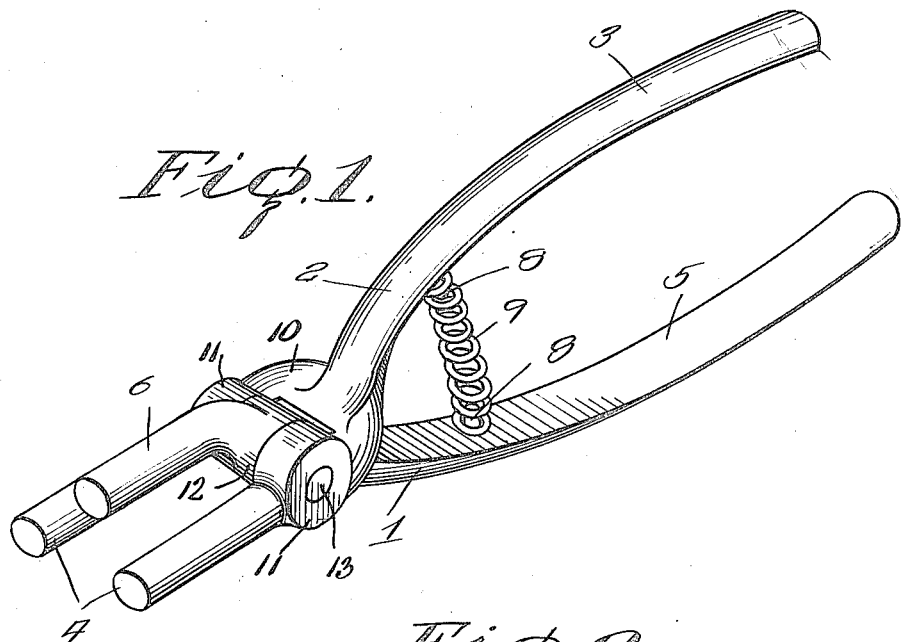
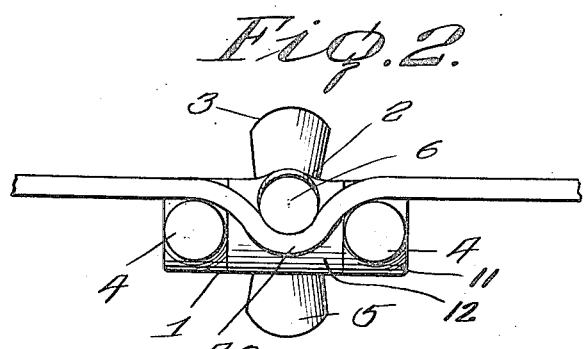
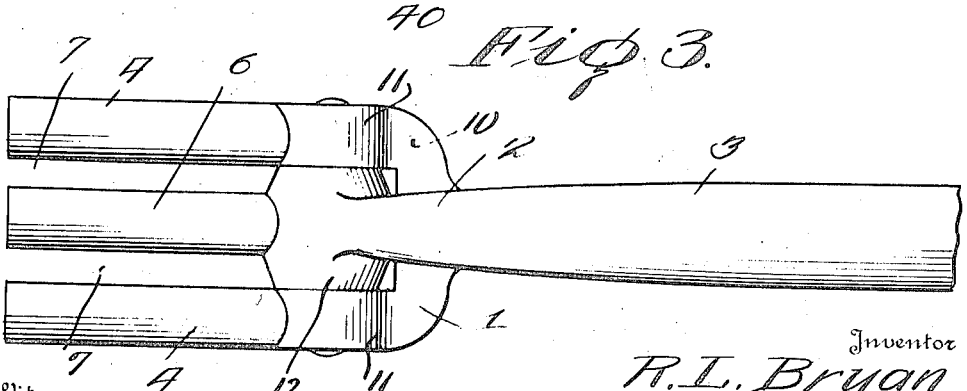
Witnesses
B. Brann
A. Ellison.
Inventor
R. L. Bryan
By (signature)
Attorneys

UNITED STATES PATENT OFFICE.

REMBERT L. BRYAN, OF ZEPHYRHILLS, FLORIDA.

IMPLEMENT FOR TIGHTENING WIRE FENCES.

1,268,922.     Specification of Letters Patent.     Patented June 11, 1918.

Application filed September 16, 1914. Serial No. 862,066.

*To all whom it may concern:*

Be it known that I, REMBERT L. BRYAN, a citizen of the United States, residing at Zephyrhills, in the county of Pasco, State of Florida, have invented certain new and useful Improvements in Implements for Tightening Wire Fences; and I do hereby declare the following to be a full, clear, and exact description of the invention, such as will enable others skilled in the art to which it appertains to make and use the same.

This invention relates to an implement for tightening wire fences.

An object of the invention is to provide a device of this character by means of which the wires of a fence after having become stretched and slackened in use may be crimped at intervals so as to take up the said slack and restore the same to its original position. Another and principal object is to provide a device including pivotally connected jaws which are straight and which thus may be easily disposed with a wire therebetween, but which are so arranged that when they are brought into engagement with a wire to perform the crimping operation there will be no tendency to force the wire from between the jaws, but on the contrary the action will tend to draw the wire inwardly of the free ends of the jaws as it is crimped.

A further object of the invention is to so construct the device that all possibility of the wire becoming cut by the use thereof will be obviated.

A further object of the invention is to make provision in the device for the positive bending of the wire in such manner that the wire will maintain its bent form after the implement is removed.

With these and other objects in view such as will appear as my description progresses my invention comprises the combination and arrangement of parts as set forth in and falling within the scope of the appended claim.

Figure 1 is a perspective view of my device;

Fig. 2 is a front elevation thereof showing the same applied to a wire; and

Fig. 3 is a plan view thereof.

My device comprises two members designated generally by the reference characters 1 and 2, the member 2 having an arcuate handle 3, and formed integral with this handle at one end thereof there is a cross-head 10 having outwardly extending parallel fingers 4 at its ends which form one of the jaws of the device, the cross-head and fingers forming a yoke. Adjacent to the cross-head, the fingers are enlarged to form parallel pin-receiving portions 11, and outwardly of these portions the fingers are cylindrical as shown. The other member 1 includes a similarly shaped handle 5 on one end of which there is formed a transverse head 12 which is disposed between the portions 11 and receives therethrough a pivot pin 13 having its ends engaged in the portions 11; and this head 12 carries an outwardly extending cylindrical finger 6 which forms a second jaw for coöperation with the jaw formed by the fingers 4.

By reference to Fig. 1, it will be seen that the fingers 4 extend radially from the pivotal connection of the members 1 and 2 but that the finger 6 is offset so that its longitudinal dimension lies tangentially of the pivot point, and thus the finger 6 is so disposed that when the handles 3 and 5 are separated under the action of the spring 9, the finger 6 will lie in a plane spaced from the plane of the fingers 4 and parallel to these fingers. It will also be seen that the head 12 extends laterally beyond the finger 6 so that this finger lies in what, considering Fig. 1, is a vertical plane between and spaced from the vertical planes of the fingers 4, and thus there are spaces 7 between the fingers 4 and the finger 6 when the finger 6 is moved to extend between the fingers 4 as shown in Fig. 2.

In order that these jaws formed by the aforementioned fingers may be normally separated I have provided on the handles 3 and 5 oppositely arranged lugs 8 on which is mounted a coil spring 9 the tendency of which is to separate the handles 3 and 5 and consequently the aforementioned jaws.

In operation the wire which is to be tightened is passed between the fingers 4 and 6. Pressure is then applied to the handles 3 and 5 to move the same together against the tension of the spring 9 which movement causes the finger 6 and the fingers 4 to move together so that the finger 6 will be located between the said fingers 4 and thus the wire will be bent as indicated at 40 and consequently the length of the said wire from one of its points of attachment to the other will be diminished. When the pressure is released from the handles 3 and 5 the spring 9 automatically separates the jaws of the device and releases the same from the wire.

The particular arrangement of the finger 6 with respect to the fingers 4 is important to the operation of this device. As shown in Fig. 1 and as already stated, the finger 6 lies parallel with fingers 4 when the jaws are open, and the fingers being straight the device may be easily engaged with a wire. When the handles 3 and 5 are brought together, the finger 6, by reason of its tangential mounting, will be so moved that its free end portion will be the first to project between the fingers 4, since this portion moves in an arc toward and away from the vertical plane of the pivot point of the two members. Thus, the finger 6 engaging the wire will tend to draw the wire inwardly of the jaws instead of tending to force the wire outwardly which would be the action resulting from a different structure in which the finger 6 was not offset to lie tangentially to the pivot point.

It is to be noted that since there is the space 7 on each side of the finger 6 between it and the adjacent finger 4, so that as the wire is crimped there will be no tendency to shear the same. It is to be also noted that the wire may be put in place between the fingers 4 and the finger 6 at any point throughout their lengths, and this makes a very desirable construction for the reason that considerable time will be saved in placing the device upon the wire previous to its operation.

It is to be further noted that the fingers 4 and 6 are of cylindrical formation so that there are no abrasive surfaces thereon to mar the wire.

While I have illustrated and described a particular embodiment of my invention it is to be understood that I do not wish to be limited to that particular embodiment, as numerous changes may be made in the details of construction thereof without departing from the spirit of the invention or without exceeding the scope of the claim.

What is claimed is:—

A wire crimper comprising a member including a handle, a cross-head carried by one end of the handle and spaced parallel cylindrical fingers carried by the ends of the cross-head, a second member including a handle, a transverse head carried by one end of the handle and a cylindrical finger carried by the said transverse head between the ends thereof, said second member being disposed with its transverse head between the fingers of the first member adjacent to their attached ends, and a pivot pin engaged through the transverse head of the second member and through the fingers of the first member for movement of the two members to shift the fingers thereof toward and away from each other, the fingers of the first member extending radially of the point of pivotal connection and the finger of the second member being offset to lie tangentially to the pivot point of the members whereby the finger of the second member will lie at times in a plane spaced from the common plane of the fingers of the first member and parallel to the fingers of the first member and at times at an angle to the fingers of the first member and projecting therebetween, all of the fingers being straight throughout the entire length of their coacting portions.

In testimony whereof, I affix my signature, in the presence of two witnesses.

REMBERT L. BRYAN.

Witnesses:
L. D. STAPLETON,
F. A. RUSSELL.